(12) United States Patent
Severinsky et al.

(10) Patent No.: US 6,226,191 B1
(45) Date of Patent: May 1, 2001

(54) UPS WITH CURRENT WAVESHAPE CIRCUIT

(76) Inventors: Alex J. Severinsky, 4707 Foxhall Crescent, NW., Washington, DC (US) 20007; David V. Day, 34 E. Centennial Dr., Medford, NJ (US) 08055

( * ) Notice: Subject to any disclaimer, the term of this patent is extended or adjusted under 35 U.S.C. 154(b) by 0 days.

(21) Appl. No.: 09/412,572

(22) Filed: Oct. 5, 1999

Related U.S. Application Data
(60) Provisional application No. 60/103,006, filed on Oct. 5, 1998.

(51) Int. Cl.[7] .............................. H02M 1/12; H02M 1/14; H02H 7/122
(52) U.S. Cl. ................ 363/40; 363/58; 363/132
(58) Field of Search .................... 363/34, 37, 39, 363/40, 41, 55, 56, 58, 98, 132

(56) References Cited

U.S. PATENT DOCUMENTS

| | | | | |
|---|---|---|---|---|
| 4,410,935 | * | 10/1983 | Dang | 363/37 |
| 5,315,497 | * | 5/1994 | Severinsky | 363/34 |
| 5,347,164 | * | 9/1994 | Yeh | 307/66 |
| 5,416,416 | * | 5/1995 | Bisher | 363/79 |
| 5,513,088 | * | 4/1996 | Williamson | 363/20 |
| 5,631,814 | * | 5/1997 | Zak | 363/37 |

* cited by examiner

*Primary Examiner*—Peter S. Wong
*Assistant Examiner*—Bao Q. Vu
(74) *Attorney, Agent, or Firm*—Banner & Witcoff, Ltd.

(57) ABSTRACT

A stand-by uninterruptible power supply which provides for extended backup time and/or an increase in power rating for stand-by power supply applications. The uninterruptible power supply also has a waveshape circuit for rating the power capacity of the supply. The waveshape circuit provides a more effective way of rating the capacity of the power supply so that different supplies may be easily compared with little confusion.

5 Claims, 6 Drawing Sheets

V AND I DIAGRAMS

EFFECT OF CURRENT LIMIT CIRCUIT

UPS WITH CURRENT WAVESHAPE CIRCUIT

CLAIM OF PRIORITY TO PRIOR APPLICATION

This application claims priority to provisional application Ser. No.: 60/103,006 filed Oct. 5, 1998.

BACKGROUND OF THE INVENTION

The present invention generally relates to the field of emergency back-up power supplies, and more particularly is directed to a stand-by uninterruptible power supply having a current waveshape circuit for rating the power capacity of the supply.

Stand-by uninterruptible power supplies (UPSs) and other forms of backup, standby and emergency power systems are well known in the prior art. Such power supplies are used to provide power to various loads when the commercial AC power supplied by the utility company is interrupted momentarily due to power failure or scheduled maintenance.

The majority of applications for stand-by UPSs are for data processing electronic devices such as computer devices which have a power range of 3 KVA and lower. In order to save on the cost of the inverter in the UPS, in some applications there is widespread use of square waveforms as illustrated in FIG. 1 and step waveforms as illustrated in FIG. 2.

These applications are usually limited to a power range somewhat below 500VA as sharp excursions of voltage and voltage harmonics cause malfunctions in numerous loads. The reason for this is that the primary load in power ranges below 500VA is a personal computer or monitor. Both use switching mode power supplies which react only on voltage peaks and not on harmonic content. Nonetheless, a sharp rate of rise or fall of voltage on edges of the step wave or the square wave causes some amount of distortion in video monitors. Another disadvantage of UPSs which produce the waveforms illustrated in FIGS. 1 and 2 is that they cause output current having a high peak value.

A typical circuit involving a prior art UPS output circuit and the load power supply input circuit is shown in FIG. 3. FIG. 4 illustrates the voltage and current diagrams showing high peak current produced by this circuit.

A current peak is limited only by the resistance of the power semiconductors and wires. These peaks are high and require larger size and higher cost inverter semiconductor switches. These peaks also cause overheating of components in the load as the heating effect is proportional to $I^2$ (square of the current).

For this reason, square or step waveforms are used only when the duration of the load operation is limited to approximately an hour. Otherwise, a sine waveform is used.

Other problems associated with prior art UPSs include confusion over their power rating capacities. This problem has become of concern as UPS usage has become more widespread. Such confusion is of particular concern with respect to lay consumers who usually do not have sufficient technical skills to read and understand power supply specifications. The problem is made more severe by manufacturers who often strive to separate their product from competitors by using confusing and very technical terminology to describe product features and benefits. Thus, there is often no effective way for a consumer to compare competing products. This is especially so with respect to power capacity rating as manufactures usually express such ratings using units of measure which portray their product in the best light. Thus, the stated power rating of one piece of equipment may not be easily compared to the stated rating of another.

Accordingly, there is a need in the art for a UPS which overcomes the above noted deficiencies with respect to peak current, thereby allowing for either extended backup time and/or increase in power rating for UPS applications. Moreover, there also is a need for a more effective way of rating the capacity of an uninterruptible power supply so that different supplies may be easily compared with little confusion.

SUMMARY OF THE PRESENT INVENTION

Accordingly, it is an objective of the present invention to obviate the above-noted shortcomings and disadvantages of methods of rating power supply capacity as known in the art.

It is a further objective of the present invention to provide an improved method of rating power capacity supply which can be easily adapted for use in a wide number of power supply embodiments and capacities.

It is a still further objective of the present invention to provide an improved method of rating power supply capacity which is economical to implement and simple in operation.

It is a further objective of the present invention to provide an improved method of rating power supply capacity which is more accurate and consistent than prior art approaches.

BRIEF DESCRIPTION OF THE DRAWINGS

The novel features of the present invention are set out with particularity in the appended claims, but the invention will be understood more fully and clearly from the following detailed description of the invention as set forth in the accompanying drawings in which:

BRIEF DESCRIPTION OF THE PREFERRED EMBODIMENT

Figure 8:
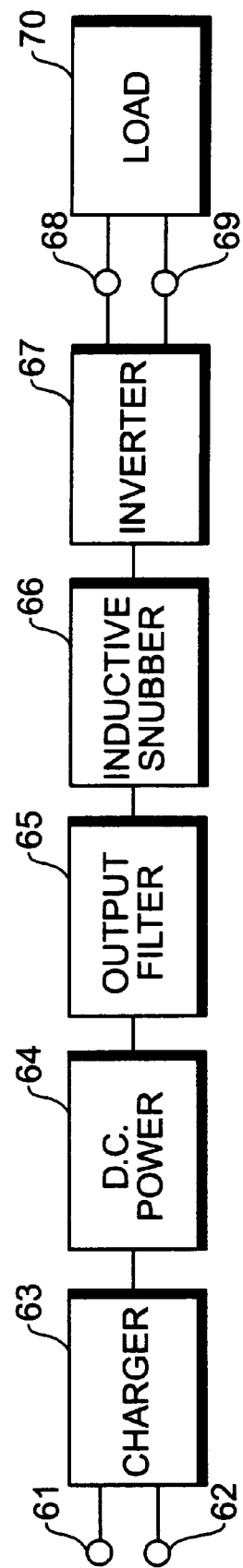
FIG. 8 is a block diagram of a UPS in accordance with the present invention.

The present invention will now be described with reference to the drawings. FIG. 8 is a block diagram illustrating an uninterruptible power supply in accordance with the present invention.

As illustrated in FIG. 8, the power supply includes a pair of input terminal 61 and 62 for receiving a source of AC power form a commercial power source. The input terminals are connect to a batter charger 63 which is used to charge battery 64. Battery 64 also is connected to output filter 65. Filter 65 may be formed from a capacitor and is used to provide a filtered source of DC power to inverter 67 through snubber circuit 66. Inverter 67 is a full wave bridge type inverter as known in the art.

Inverter 67 includes a pair of output terminals 68 and 69 to which a load 70 may be attached. The output waveform of the inverter is substantially a square wave with a varying duty cycle. Such a waveform is distinguished from a sine wave due to the presence of step voltage changes rather than gradual changes over time.

Applicants have discover that substantial beneficial results can be achieved by forming snubber circuit 66 from an inductance. The snubber inductor is designed to limit the inverter peak current to values close to the peak current values present when the load is powered from the utility power line. The amount of resistance used for snubber 66 is determined in such a way that the inductor current at the beginning of the voltage pulses is substantially lower than the current peak during the pulse.

Figure 1:
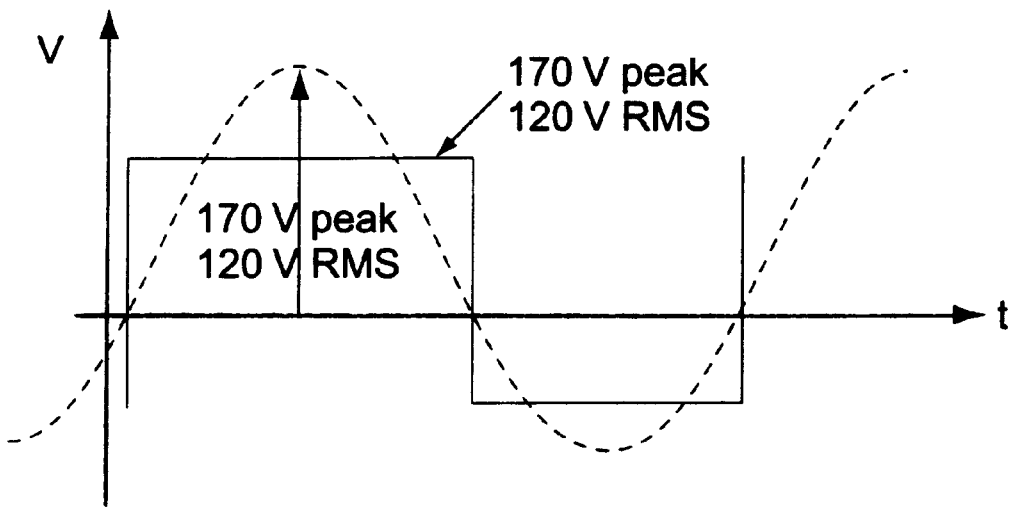
FIG. 1 is a waveform illustrating the output current of a conventional UPS power supply inverter using a square waveform.
Figure 2:
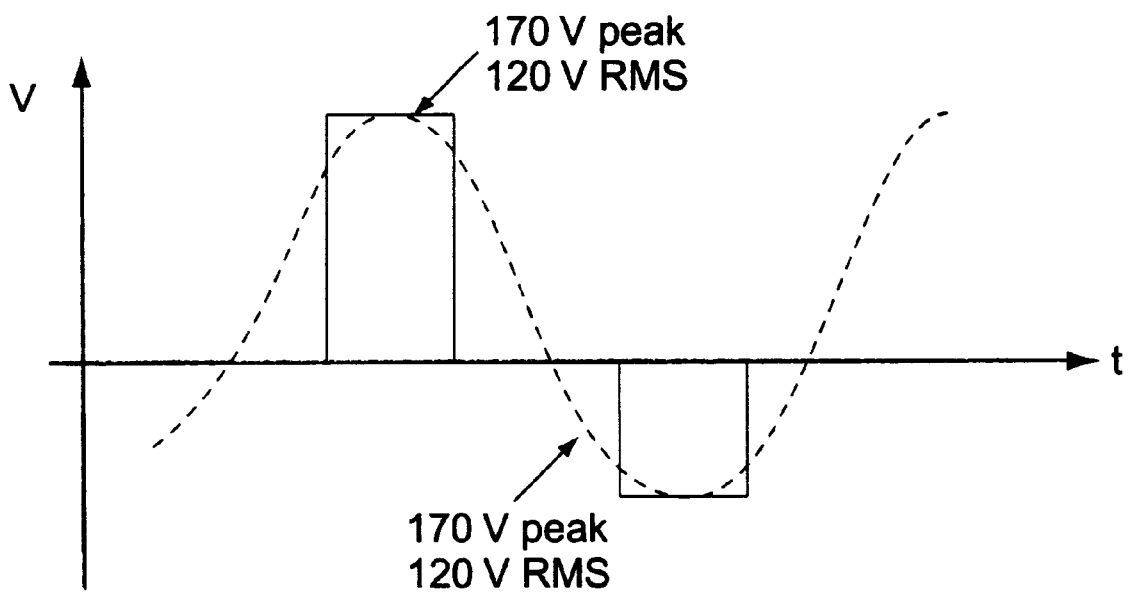
FIG. 2 is a waveform illustrating the output current of a conventional UPS power supply inverter using a step waveform.
Figure 3:
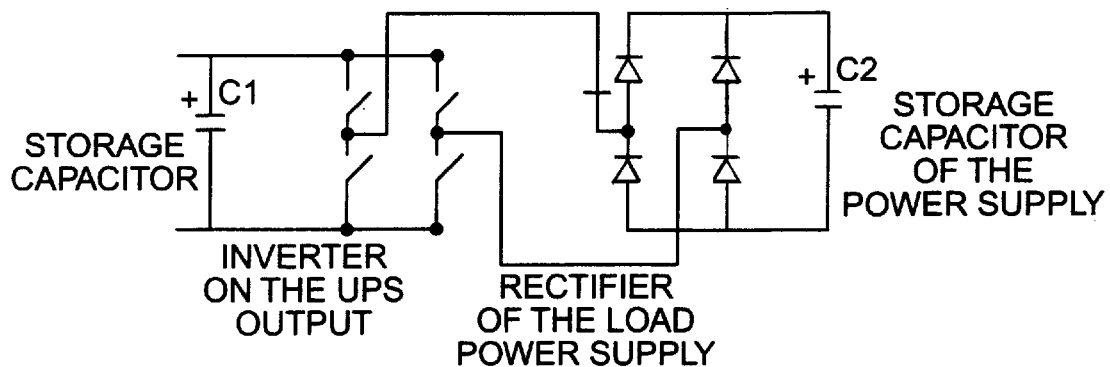
FIG. 3 is a circuit diagram of a conventional power inverter as used in an UPS power supply which produces the current waveforms shown in FIGS. 1 and 2.
Figure 4:
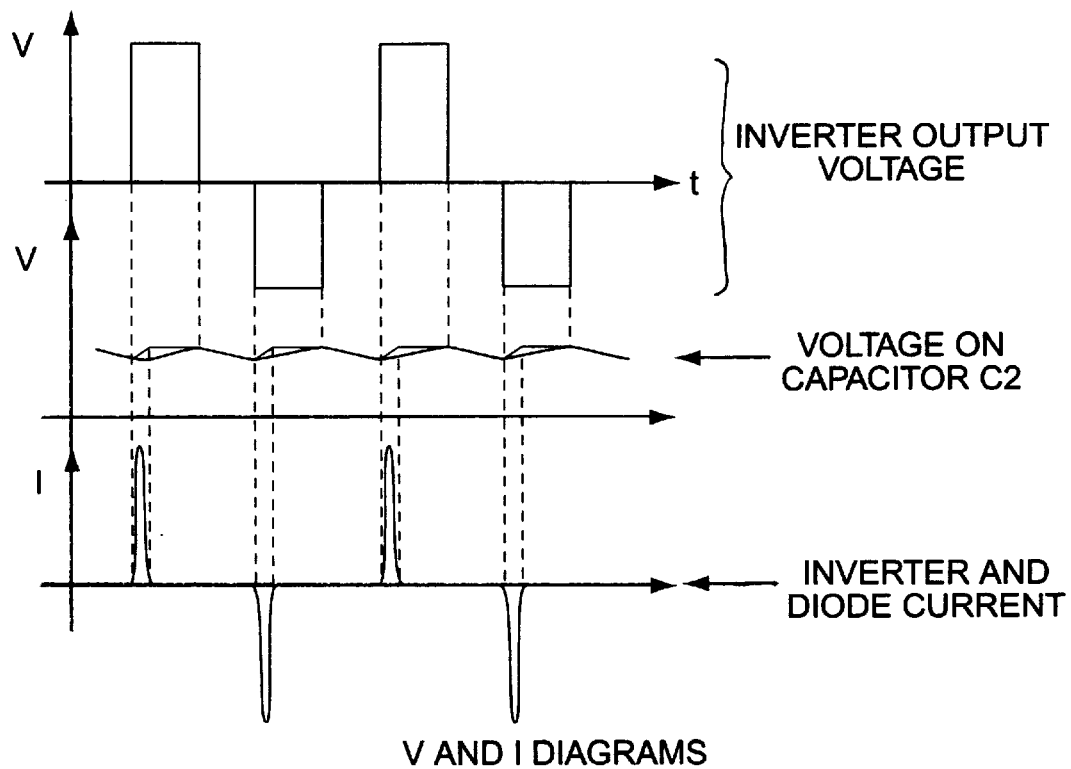
FIG. 4 is a waveform illustrating the output voltage and current of a conventional UPS power supply inverter having a high peak current.
Figure 5:
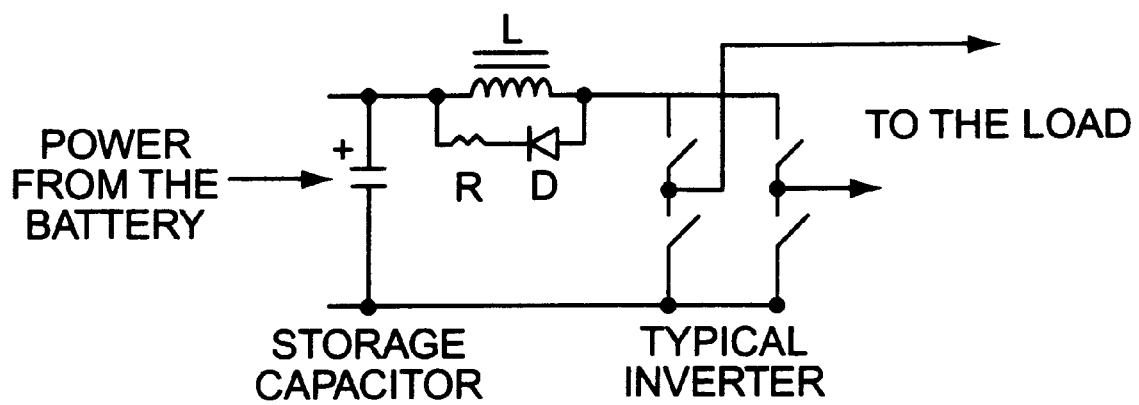
FIG. 5 is a circuit diagram of an inverter in accordance with the present invention.
Figure 6:
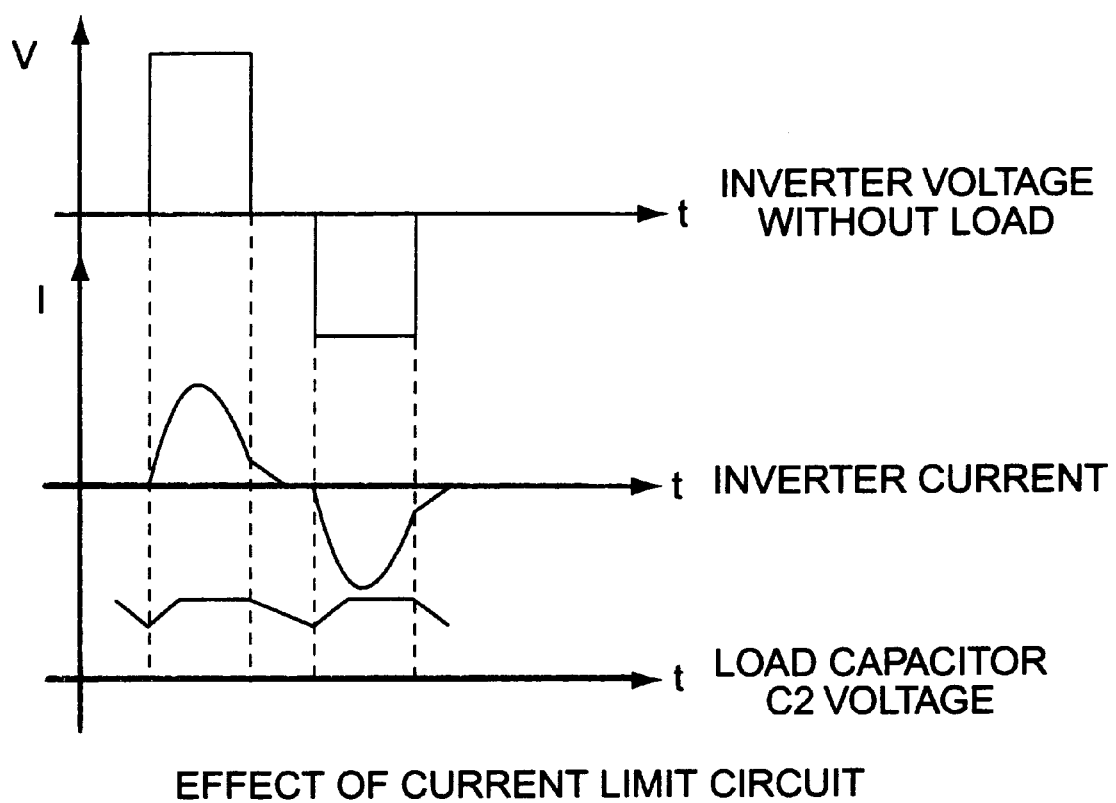
FIG. 6 illustrate the voltage and current waveforms for a step inverter in accordance with the present invention.

The preferred change in the inverter using a snubber in accordance with Applicants' invention is illustrated in FIG. 5. In this circuit, the choke L is used to limit the current used and correspondingly its peak value. The snubber R-D is used to discharge the choke L between inverter current pulses on the output. The typical voltage and current diagrams for a step wave inverter resulting from the inverter shown in FIG. 5 are illustrated in FIG. 6.

At the end of the inverter pulse, there is a residual current in the choke due to its effect—making current amplitude smaller but duration longer. Duration is longer because the total charge ($SId_t$) delivered to the load for the same power is the same, with or without current limiting circuit. The purpose of the R-D snubber is to discharge the choke from this current.

Figure 7:
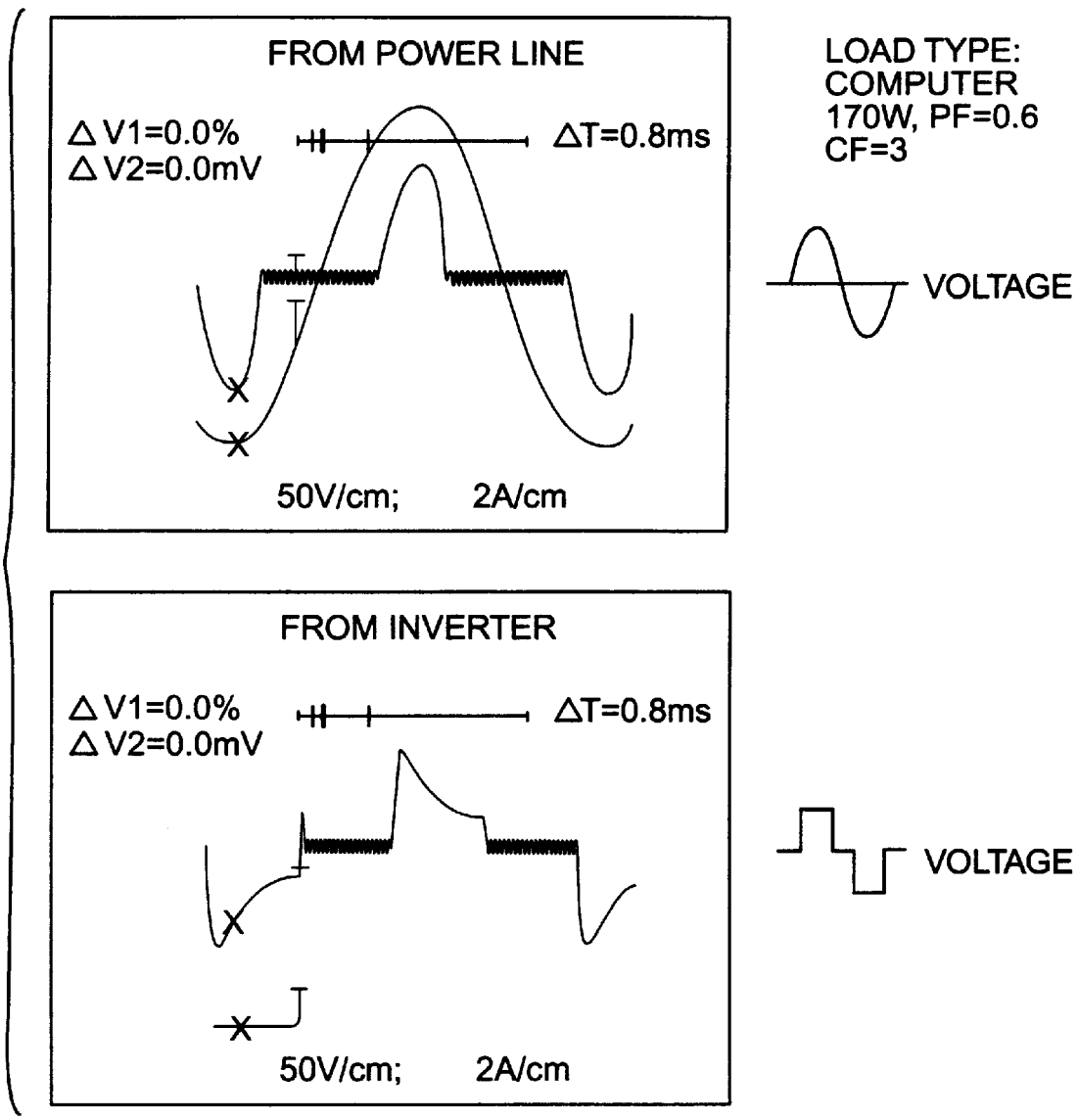
FIG. 7 illustrate oscilloscope traces showing the operation of an inverter accordance to the present invention.

This type of current waveform is a lot closer to the one when the load, which is a rectifier type, is powered from the power line as illustrated by the oscilloscope traces in FIG. 7. This means that the load will not incur more power losses when operated from a stepwave inverter with current limiter. Further, this allows for extended backup times and/or larger power rating.

Additionally, to reflect this ability of an inverter with the current limiter to make current the same, it is advisable to rate the inverter output in terms of peak volt-amperes delivered to the load (a) from the power line and (b) and from the inverter.

Peak VA is equal to peak voltage multiplied by peak current at the instant of peak current. This type of rating is easier to control than the more traditional RMS units which are difficult to connect to affects on the load while powered, not by a sine wave, but a step wave.

It has been found that when using the inductive snubber as illustrated in FIG. 5, the capacity of the power supply can be easily determined by multiplying the instantaneous values of peak voltage by peak current to obtain the maximum product when a load is being powered by inverter 67. This method yields a more accurate determination of capacity with the attendant confusion associated with capacity determination currently being used in the prior art.

Applicants' novel use of a snubber in the present invention is substantially different than the uses made of snubbers in the prior art. The inductors used in prior art snubbers are designed to limit current within the current rise time of the semiconductor switch. This rise time is usually between 10 nano seconds and 1 microsecond. The inductor is designed to limit current to a value which can be safely handled by the semiconductor, whatever that value might be. Thus, the inductor in prior art snubbers are designed, not for peak load value of current, but for the maximum value of current that will exist during the current rate of rise time ($\text{Delta}_I \text{Delta}_T$). Typically, this interval is very short and is usually less than 1 micro second. This results in a difference of inductor values orders of magnitudes.

The inverter used in the present invention produces a square wave pulse at 60 Hz. A different frequency, for example 50 to 400 Hz, may be used as well. When the value of the inductance for the snubber circuit is selected in accordance with the present invention, the objective is not to limit the current rate of rise, but to limit the peak value of the current during the pulse when the inverter is used to power a non-linear computer load.

When the computer load is non-linear and is powered from the power line, current also is non-linear with a peak because it is only in the middle of the voltage when peak voltage is high. When the load is switched to the inverter, the inductor used in the snubber is selected so that current remains at peak value within some reasonable range, plus or minus 20 percent. Thus, the inductor will have a much higher inductance because the time duration for its use will be in milliseconds rather than micro-seconds.

It should be obvious from the above-discussed apparatus embodiment that numerous other variations and modifications of the apparatus of this invention are possible, and such will readily occur to those skilled in the art. Accordingly, the scope of this invention is not to be limited to the embodiment disclosed, but is to include any such embodiments as may be encompassed within the scope of the claims appended hereto.

We claim:

1. An uninterruptible power supply for supplying power to a load having an input rectifier and a capacitive filter drawing substantially non-linear current, said power supply comprising:

a source of DC power;

a power inverter connected to said source of DC power through an inductive snubber circuit for providing power to a load, wherein the output voltage waveform of said power inverter is a substantially square wave having a varying duty cycle and wherein said inductive snubber limits the peak current of said power inverter to a value substantially close to the peak current present when said load is powered from an AC source of power.

2. The uninterruptible power supply of claim 1 wherein said source of DC power is a battery.

3. The uninterruptible power supply of claim 2 further including a battery charger for charging said battery.

4. The uninterruptible power supply of claim 3 further including an output filter coupled between said battery and said inductive snubber for providing to said inductive snubber a filtered source of DC power.

5. A method of rating the power capacity of an uninterruptible power supply for powering a load, wherein said power supply has a power inverter supplied with power from a source of DC power, said method including the steps of:

providing an load between said source of DC power and said load; and multiplying the instantaneous values of peak voltage by peak current to obtain the maximum product when said load is being powered by said inverter.

\* \* \* \* \*